United States Patent Office 3,138,465
Patented June 23, 1964

3,138,465
MEAT CURING PROCESS
Charles P. Naschek, 550 E. 91st St., Brooklyn 36, N.Y.
No Drawing. Filed Apr. 30, 1962, Ser. No. 191,373
2 Claims. (Cl. 99—159)

This invention relates to an improved process for curing meat, and more particularly to an improved process for processing beef to produce a highly seasoned pastrami-like product having the appearance and flavor of pastrami.

Pastrami is prepared from what is known as "navel of beef" and, in the past, has been prepared by a smoking process. However, some authorities believe, from the results of surveys and experiments that smoking introduces certain harmful substances into the fatty parts of the meat.

It is desirable to prepare highly seasoned beef having the characteristics of pastrami by some process other than smoking and which would contain a smaller percentage of fats than pastrami. To devise such a process has been a problem since, of course, to make the product acceptable to the trade, it must still retain the well-known flavor, color and appearance of pastrami.

A principal object of the present invention is to provide an improved method of preparing highly seasoned "navel of beef" without utilizing any smoking step.

A further object of the invention is to provide an improved method of preparing highly seasoned beef similar in taste and appearance to pastrami for producing a product having improved flavor and desirable appearance.

A still further object of the invention is to provide an improved process of preparing highly seasoned beef without utilizing any smoking step and resulting in a product having a lower fat content than pastrami.

These and other objects will be more apparent and the improved process of the present invention will be more readily understood from the more detailed description of a specific embodiment which follows.

In general, the process of the present invention comprises soaking a quantity of a navel of beef in a salt brine containing sodium or potassium nitrate in addition to common table salt, and then boiling the brine-treated meat in a more dilute brine containing a small proportion of vinegar until a major part of the saturated fats are removed.

*Example*

First step in the process is to prepare a brine which may contain about 9.25 lbs. of table salt and 2.25 lbs. of potassium nitrate per 10 gallons of tapwater. A quantity of fresh, trimmed navel beef is soaked in this brine for a period of 24 to 48 hours at a temperature of about 38° to 40° F. The amount of brine used must be such as to completely cover the meat.

Prior to placing the meat in the brine, the brine should have a salometer reading of about 55° to 60°. At the end of the soaking period, the salometer reading will have dropped to around 40°. Spices of various kinds may be included in the brine to improve the taste of the product. Such spices may include, by way of example, red pepper and paprika.

The next step in the process is to remove the navel of the beef from the cool brine and make up a more dilute brine by mixing about 10% of the original brine having a salometer reading of 55°–60° and 90% (by volume) water. To this dilute brine is added about one ounce of distilled white vinegar per 10 gallons of solution in order to retain the desired color for the meat.

The navel of beef is placed in this solution and boiled at atmospheric pressure for about 1½ hours. Sufficient liquid is again used to completely cover the meat. During this part of the process about 60 to 70 percent of the fat contained in the meat floats to the surface and is skimmed off. The fat which remains is largely of the polyunsaturated type. In the hitherto used smoking process employed in the making of pastrami only about 10% of the fat was removed and the remaining fat absorbs ingredients from the smoke which have come under suspicion as being harmful.

In addition to providing a pastrami-like product which is more desirable because it eliminates certain health hazards, the product of the present invention has improved taste.

What is claimed is:

1. A process of preparing an edible beef product without the need for smoking the beef, which consists of preparing a cool brine having a salometer reading of about 55° to 60° and containing about 9.25 lbs. of table salt and about 2.25 lbs. of a substance selected from the class consisting of sodium and potassium nitrate per 10 gallons of water at a temperature of about 38° to 40° F., soaking said beef in said brine for a period of 24 to 48 hours until the salometer reading drops to about 40°, and then boiling said beef in a dilute solution of a brine containing about 9 volumes of water and 1 volume of a brine having the same composition and salometer reading of about 55° to 60° as the original brine and also about one ounce of white distilled vinegar for a time sufficient to remove about 60 to 70% of the fat content of said beef.

2. A process of preparing an edible finished beef product without the need for smoking the beef, which comprises preparing a cool brine at a temperature below 40° F. having a salometer reading of about 55°–60° and containing table salt and a substance selected from the class consisting of sodium and potassium nitrate, soaking said beef in said brine until the salometer reading drops to about 40°, and then boiling said beef in a dilute solution of a brine consisting of 9 volumes of water and 1 volume of a brine having the same composition and salometer reading as the original brine, for a time sufficient to remove about 60 to 70% of the fat content of said beef.

References Cited in the file of this patent

UNITED STATES PATENTS

| | | |
|---|---|---|
| 2,247,425 | Williams | July 1, 1941 |
| 2,416,190 | McKee | Feb. 18, 1947 |
| 2,613,151 | Forsythe | Oct. 7, 1952 |
| 2,844,478 | Hauby et al. | July 22, 1958 |

FOREIGN PATENTS

| | | |
|---|---|---|
| 542,831 | Great Britain | Jan. 28, 1942 |

OTHER REFERENCES

"Sausage and Meat Specialties, The Packers Encyclopedia, Part Three," compiled by trade journal, "The National Provisioner," published 1938, pages 165 and 166.